P. A. PALMER.
Cooking Stove.
No. 811
Reissued Sept. 13, 1859
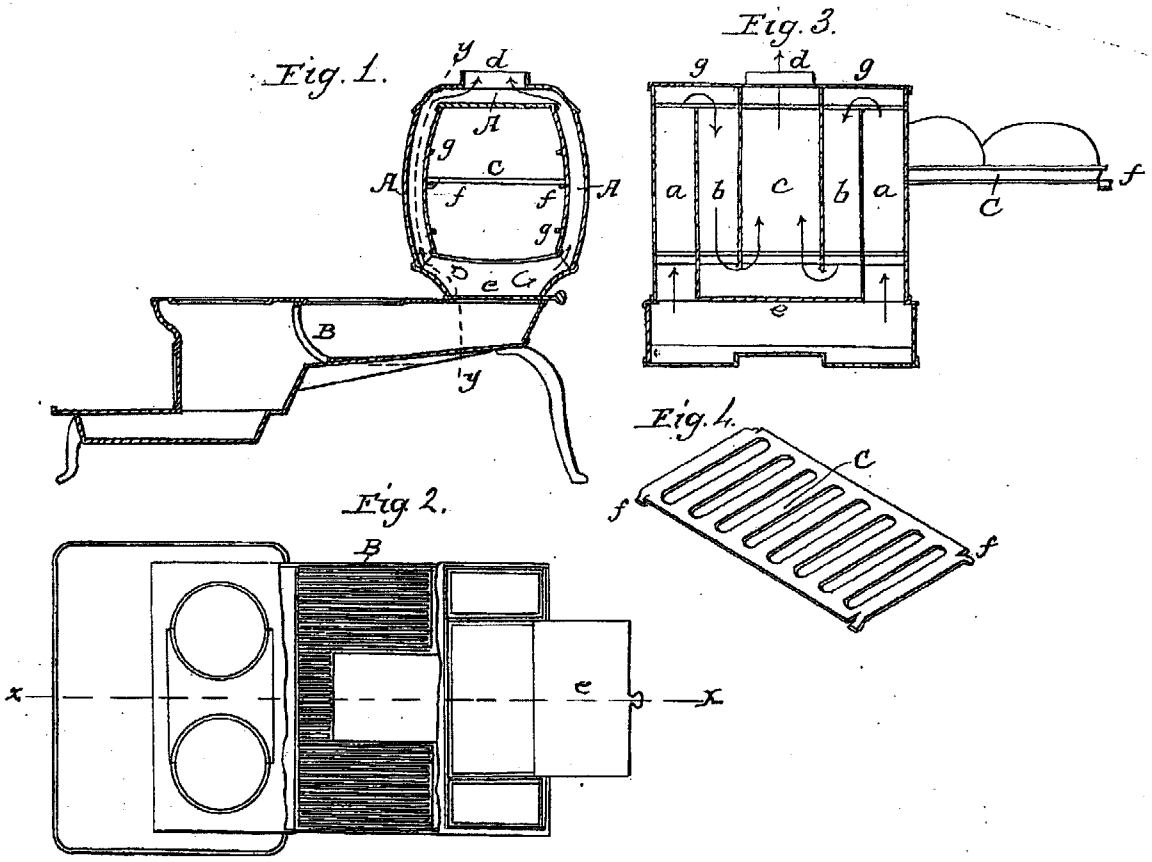
N. PETERS, Photo-Lithographer, Washington, D. C.

UNITED STATES PATENT OFFICE.

P. A. PALMER, OF TROY, NEW YORK.

IMPROVEMENT IN HEATING ELEVATED OVENS.

Specification forming part of Letters Patent No. 7,672, dated September 24, 1850; Reissue No. 811, dated September 13, 1859.

*To all whom it may concern:*

Be it known that I, P. A. PALMER, of the city of Troy, county of Rensselaer and State of New York, and formerly of Le Roy, in the county of Genesee and State aforesaid, have invented new and useful Improvements in Cook-Stoves and Heating Elevated Ovens; and I do hereby declare that the following is a full and exact description of the nature, construction, and operation of the same, reference being had to the accompanying drawings and to the letters of reference marked thereon, and making a part of this specification, in which—

Figure 1 is a vertical section through the stove from the front to the back, taken on the line *x x* of Fig. 2, which figure is a top view of the stove with the oven removed and a part of the top plate broken away. Fig. 3 is a front view of the oven with the front plate removed, thereby showing the arrangement of the flues around the oven. Fig. 4 is a perspective view of the oven grate.

Like figures represent like parts.

The nature of my invention consists in the arrangement of any kind of revertible flues in elevated ovens for cook-stoves, no matter how or in what manner such flues are or may be formed, constructed, or made, or in what kind of elevated ovens the said flues are or may be constructed or arranged, which are hereinafter described.

It further consists in so constructing and arranging an oven-grate so as to admit of its being drawn nearly out from the oven, and then and there supported in nearly a horizontal direction, notwithstanding the weight thereof, and an additional weight of any substance placed thereon for baking or cooking purposes.

It also further consists in the arrangement of a damper, hereinafter described, so that by such arrangement and the combination of such damper with the body or main part of the stove and the elevated oven the heat or heated air is fully and completely controlled at the will of the operator, in its passage from the main part of the stove into the elevated oven, and admitted to or excluded from the aforesaid flues, or allowed to pass off or away through the exit-pipe.

To enable others skilled in the art to make, construct, and use my improvements, I will here proceed to describe the construction and operation of the same.

My stove has an elevated oven which is immediately connected to and with the main or body part of said stove without any intervening neck or pipe. This oven is constructed with an outside and an inside plate, between which I arrange revertible flues, hereinafter more fully described, for the purpose of retaining and more evenly, successfully, and completely distributing the heat throughout the entire oven. I divide the space A surrounding the said oven into any desired or required number of flues—such as *a a*, *b b*, &c.—in the front and in the back of the said oven. I then admit draft in and to the flues *a a* at the lower end and bottom thereof, consequently, at the bottom of the oven. The draft then passes up the said flues to an opening in the partition-wall between the said flues *a a* and *b b* at or near the top thereof; thence into and down the flues *b b* to an opening in the partition-wall between the said flues *b b* and the double flue *c*, at or near the bottom thereof; thence into and up the double flue *c* to the exit-pipe *d*, from whence it passes off or away, as shown and represented by the arrows. When the oven is not in use, the draft may be admitted immediately to the exit-pipe *d* through the double flue *c*, which is done by opening the damper *e*. The great advantages in and by this arrangement of flues are, first, the retaining of the heat around and about the oven for a greater length of time than could otherwise be done were it not for these flues; second, constituting it a more even and perfect baker; and third, the leading and bringing the heat directly to the respective ends of the said oven, and thereby throwing and passing it immediately under the boiler holes *g g* upon the top of said oven, which have heretofore been inoperative and of no use on account of the want of heat being conducted away therefrom by means of a direct line of draft from the stove to the exit-pipe, but now by the use of said flues rendered operative and of great use on account of the heat being conducted to their immediate locality.

When more than two boiler-holes are formed in the lower part of the stove, I arrange the grate B back of the front boiler-holes. Then, the fire being built upon this grate, the heat is applied more directly to the back boilers and oven, without heating the entire stove, thereby saving a great proportion of the fuel by shortening the passage for the heat. This grate may be made in any required or desired way, shape, or manner to answer the purpose.

The oven-grate *c*, I construct and employ with hook *f f* projecting below so as to guide and hold the said grate upon the bearing rods or projections *g g*, Fig. 1, upon the inner plate of the said oven. These guides or bearings for the said grate (shown at Fig. 4, and partly drawn out from the oven in Fig. 3) may be of round or square rods of iron, and fastened therein by means of the ends of the said oven into which the ends thereof are inserted, or they may be cast of iron with a channel or groove therein, and extending the entire length thereof, and fastened in and to the said oven, as hereinbefore described. This grate, when thus arranged, being drawn in part or nearly out from the said oven, will sustain and support itself with its own weight and the weight of material thereon for baking or cooking purposes, at any distance or point whenever desired, until the said grate be entirely removed from the oven. Grooves or channels may be constructed along the edge of the said grate on either side thereof.

The damper *e*, Fig. 2, I construct so as to slide or open directly from under the flues *b b* and *c*, &c., and immediately between the lower part of the oven aforesaid, and the top or upper part of the stove, or it may be so constructed and arranged as to turn upon a bearing at each end thereof, and operated in any convenient way or manner. This damper is made in length to correspond to the distance between the partition-walls of the flues *a a* and of any desired width. This damper is for the purpose of regulating, guiding, and controlling the heat in its passage from the main or body part of the stove into the aforesaid flues, and thereby regulate the heat or temperature of the elevated oven, as aforesaid. It therefore compels the heat to enter the flues *a a* when it is closed, or when opened allows it to pass immediately and directly to the exit-pipe without being equalized or distributed over and about other parts of the said oven. It will, therefore, be seen that without this damper the heat or temperature of the elevated oven could not be distributed equally over and about said oven, nor could it be confined and controlled; therefore, it is very important as arranged closely and immediately between the main part of the stove and the elevated oven, as aforesaid.

I construct the partition-walls between the aforesaid flues in any way, shape, or manner, or from any material which shall endure the heat, and insure the accomplishment of the great end designed, and the fulfillment and carrying out of the principle herein and hereby described by the use of said flues. These partition-walls may be made of cast-iron, smooth or corrugated, as the case may be, or it may be made of boiler-iron or sheet-iron and smooth or corugated, or they may be made of hollow pipe, either cast-iron, boiler or sheet iron, and placed in close proximity to each other, or they may be made by using a double thickness of either form, shape, or manner in which they are or may be made or constructed.

Having thus described my improvements, what I claim, and desire to secure by Letters Patent, is—

1. The arrangement and combination of revertible flues in elevated ovens of cook-stoves with partition-walls, in the manner as and for the purpose herein described and set forth.

2. The arrangement and combination of the oven-plate *c* in and with the inner plate and ends of the oven, as and for the purpose herein herein described and set forth.

3. The arrangement of the damper *e* immediately between the main part of the stove and the bottom or lower part of the elevated oven, thereby combining it with said oven, the stove, and the double flue *c* for the purpose of controlling and regulating the heat in its passage into the flues of the said elevated oven, as herein described, disclaiming any damper found in any stove not having an elevated oven, as herein set forth.

In testimony whereof I have hereunto set my hand on this 19th day of July, 1859.

P. A. PALMER.

Witnesses:
MARCUS P. NORTON,
C. W. PALMER.